Aug. 12, 1969　　　　N. H. KEMP　　　　3,460,376
PRESSURE TESTING DEVICE FOR PIPE AND GAUGES
Filed May 17, 1968　　　　　　　　　　　2 Sheets-Sheet 1
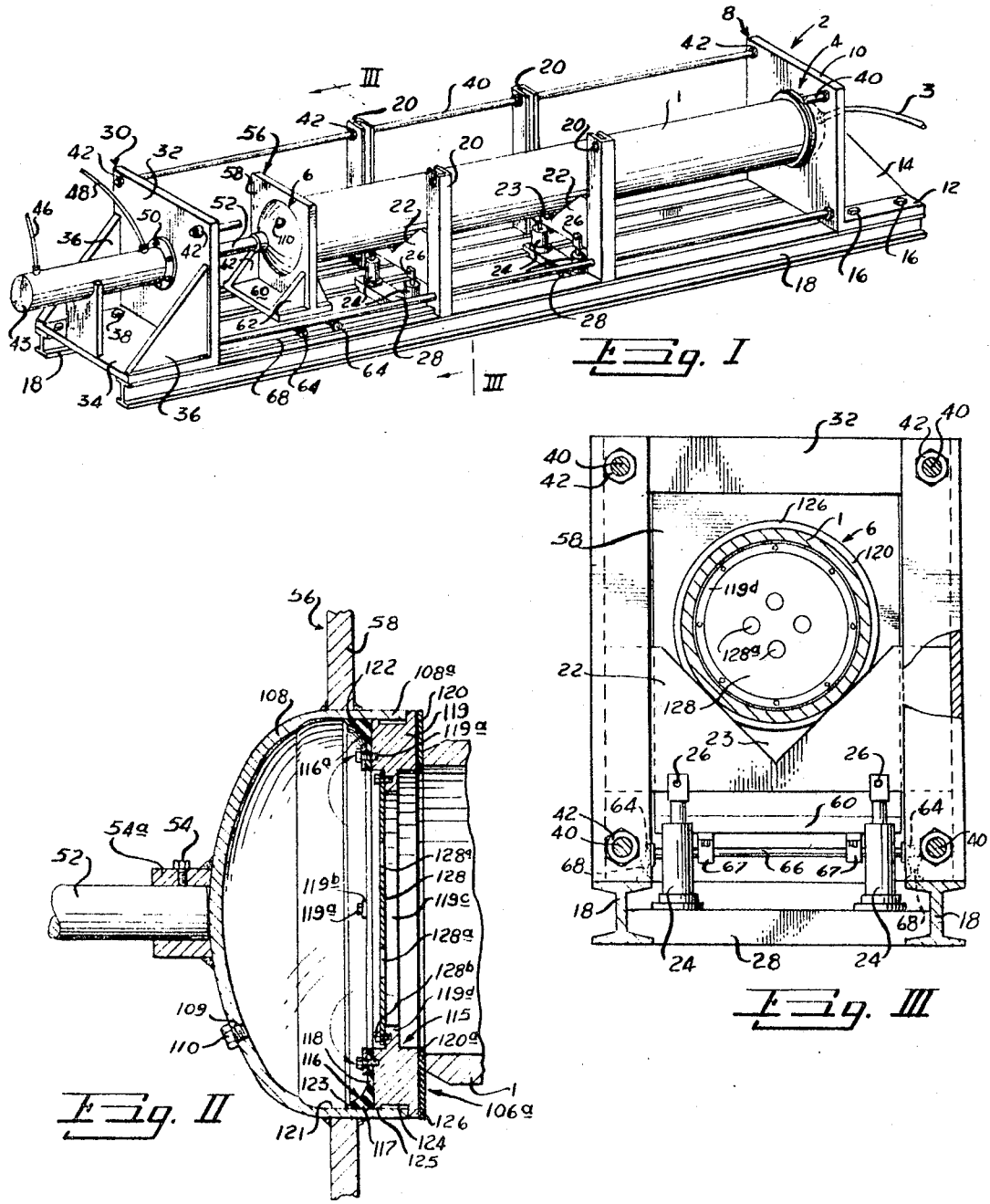
NORMAN H. KEMP
INVENTOR.
BY Howard E. Moore
ATTORNEY

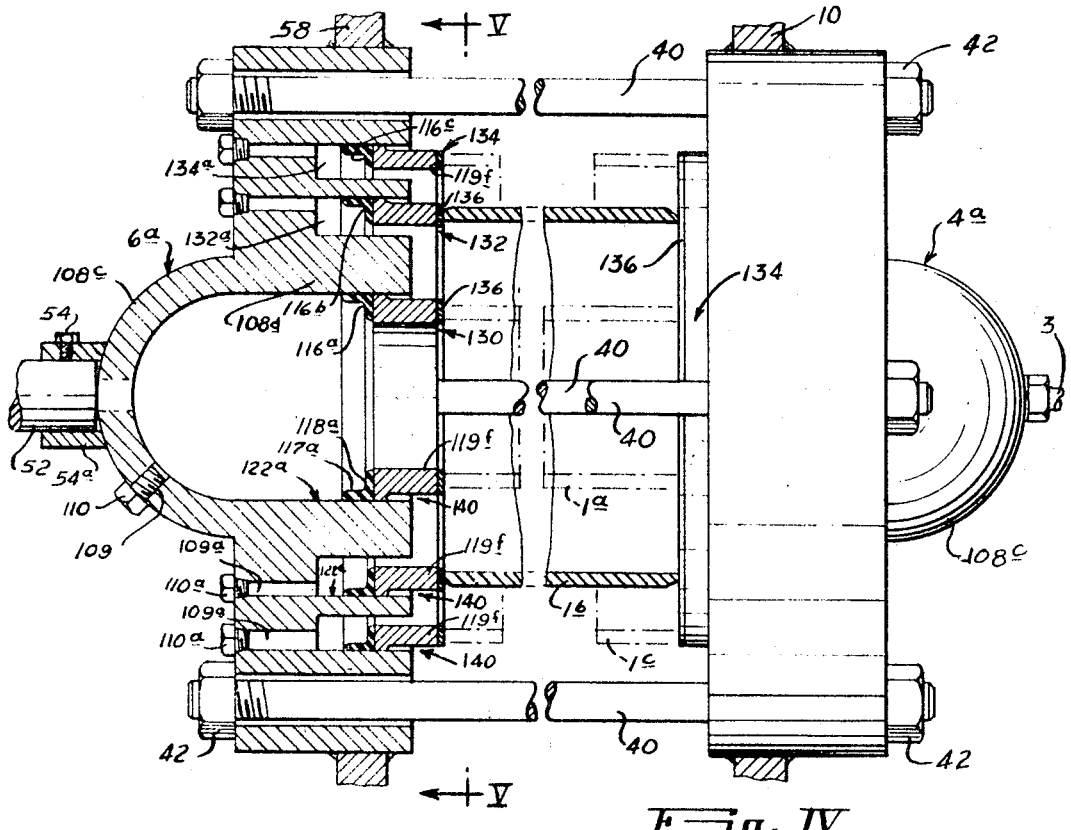
Fig. IV
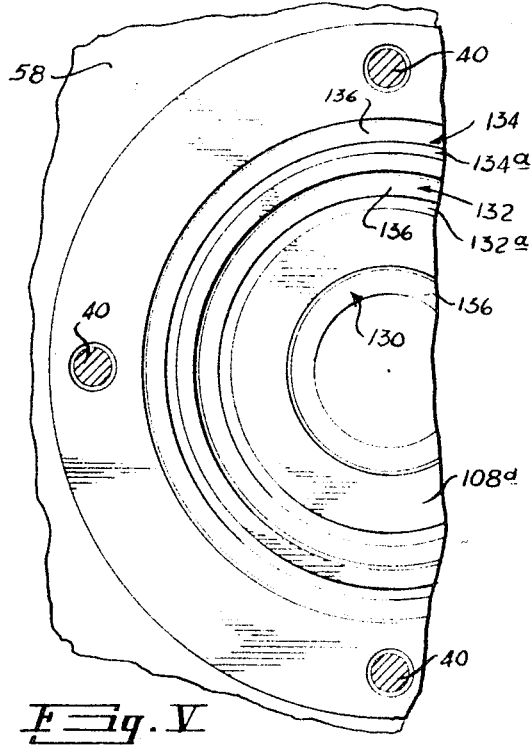
Fig. V
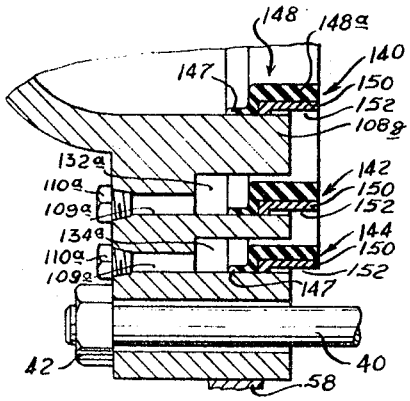
Fig. VI
NORMAN H. KEMP
INVENTOR.
BY Howard E. Moore
ATTORNEY United States Patent Office 3,460,376
Patented Aug. 12, 1969

3,460,376
PRESSURE TESTING DEVICE FOR
PIPE AND GAUGES
Norman H. Kemp, 726 Regal Row, Dallas, Tex. 75247
Continuation-in-part of application Ser. No. 494,061,
Oct. 8, 1965. This application May 17, 1968, Ser.
No. 729,967
Int. Cl. G01m 3/08
U.S. Cl. 73—49.5                                    20 Claims

ABSTRACT OF THE DISCLOSURE

A device for testing pipes hydrostatically comprises supports for the pipe being tested, a stationary sealing head and a movable sealing head. The sealing heads include sealing assemblies which act to seal against the pipe being tested by means of the pressure of the hydrostatic test fluid. The supports are provided with jacks to adjust their height. The sealing heads may be provided with a plurality of sealing assemblies so that pipes of different diameters may be tested.

Background of invention

This is a continuation-in-part of my co-pending patent application Ser. No. 494,061, filed Oct. 8, 1965, on "Closure Seal" now Patent No. 3,387,738.

The petroleum industry is faced with numerous problems which have evolved from the constantly increasing interest in offshore pipelining and offshore drilling operations. Statistics show that 15% to 20% of the petroleum industry's total expenditures for exploration and development in recent years have been invested in offshore operations.

As pipelining moves into deeper waters, new techniques and devices must be developed to reduce ultimate expenditures in development of the continental shelf areas. As pipe lines are laid at depths in excess of 350 feet and as wells are drilled in water at depths in excess of 600 feet, the need for quality pipe increases.

Non-destructive testing of individual sections of pipe is an absolute necessity because of the great expense involved in laying and maintaining the pipe. Rupture of a single joint of pipe in an offshore pipeline often necessitates the use of numerous barges and expensive equipment for rasing a mile or more of the pipeline before repairs can be made.

Hydrostatic testing devices heretofore developed have encountered difficulty in carrying out testing operations due to difficulty experienced in properly sealing the openings at the ends of the pipe during such testing operations.

In some instances a cover or cap has been welded over the opening while testing, and the cap is cut off, as by a torch after the test has been made. Welding caps or flanges on the end of a pipe is very time-consuming and expensive particularly in view of the fact that the pipe is tested several times after it is manufactured and before it is laid.

The pipe is tested at the plant prior to shipment to the point of use. After shipment, the pipe is often again tested to assure that it has not been damaged in shipment.

Summary of invention

Applicant has overcome these problems by providing a pressure testing device having a fixed sealing head and a movable sealing head which may be positioned adjacent opposite ends of a joint of pipe. Each sealing head includes a closure seal which positively closes the ends of the pipe by a uniform sealing surface actuated by internal pressure injected into the pipe for testing purposes.

A primary object of the invention is to provide means for sealing about open ends of a joint of pipe which may be easily and quickly applied over and about the openings, and which may be easily and quickly removed therefrom.

Another object of the invention is to provide a pressure testing device in which a joint of pipe or other object to be tested may be positioned upon an adjustable support with one end adjacent a stationary sealing head whereby a second movable sealing head may be positioned adjacent the other end of the pipe wherein the seal is actuated and uniformly applied by injecting pressure into the joint of pipe to positively close the open ends thereof and wherein the greater the injected pressure the tighter the seal is applied.

Another object of the invention is to provide a pressure testing device having a closure and seal member for sealing about the open end of a joint of pipe being tested, said seal having angularly disposed flanges thereon, one of which seals about the opening in response to internal pressure within the joint of pipe, and the other of which seals against the inner wall of the closure in response to internal pressure exerted within the joint of pipe to thereby provide a positive and uniformly applied seal quickly and easily.

Another object of the invention is to provide a pressure testing device having a plurality of sealing surfaces whereby joints of pipe having different diameters may be tested utilizing a single set of pressure heads.

Other and further objects of the invention will become apparent upon reading the detailed specification hereinafter following and by referring to the drawings annexed hereto.

Description of drawing

The accompanying drawings of three preferred embodiments of the present invention are provided so that the invention may be better and more fully understood, in which:

FIGURE I is a perspective view illustrating the relation of the present invention to a joint of pipe being tested;

FIGURE II is a vertical cross sectional view through one of the sealing heads;

FIGURE III is a cross sectional view taken along lines III—III of FIGURE I;

FIGURE IV is a side elevational view of a second embodiment with one sealing head shown in cross section similar to FIGURE II;

FIGURE V is a cross sectional view taken along lines V—V of FIGURE IV with the pipe cut away; and, FIGURE VI is fragmentary, cross sectional view of a third embodiment similar to FIGURE II.

Numeral references are employed to indicate the various parts as shown in the drawings and like numerals indicate like parts throughout the various figures of the drawings.

Description of a preferred embodiment

Referring to the embodiment shown in FIGURES I, II and III, the numeral 1 indicates a joint of pipe positioned in the pressure testing device generally designated by the numeral 2.

Pressure testing device 2 consists of a fixed head 4 and a movable head 6 which may be positioned adjacent opposite open ends of a joint of pipe 1 forming closures therefor.

Fixed head 4 is welded or otherwise rigidly secured to anchorage 8 consisting of an upright support 10 rigidly connected to base plate 12 and angle braces 14. Fixed head 4 has an inlet connection 3 through which pipe 1 may be filled by attaching connection 3 to a source of fluid pressure.

Fixed anchorage 8 is adjustably secured by bolts 16 to skids 18 extending longitudinally of pressure testing device 2.

Skids 18 may be of any suitable configuration; however, the particular embodiment illustrated in the drawing shows a steel I-beam construction.

Upright stanchions 20 are channel members welded or otherwise rigidly secured to skids 18 intermediate the ends thereof between fixed head 4 and movable head 6. Support plates 22 extend transversely of pressure testing device 2 and are slidably disposed at opposite ends in channel members 20. Hydraulic jacks 24 have extendable piston rods rigidly connected to support plates 22 by pins 26. Jacks 24 are secured at their lower end to transversely extend cross members 28 which are welded or otherwise rigidly secured to skids 18.

A V-shaped opening 23 is formed in each plate 22 for centering pipe 1 therein.

A second anchorage 30, consisting of upright support 32, base plate 34 and angle braces 36, is rigidly secured to skids 18 by bolts 38 at the other end of the pressure testing device 2 in spaced apart relation from anchorage 8.

Tie bars 40 are rigidly secured to anchorage 8, stanchions 20 and anchorage 30 by nuts 42.

A conventional double acting hydraulic cylinder 43 having fluid supply lines 46 and 48 communicating therewith is secured to anchorage 30 by bolts 50. Hydraulic cylinder 43 has a hydraulic actuated piston rod 52 slidably disposed therein.

The movable head 6 is rigidly connected to rod 52 by a set screw 54 extending through collar 54a.

The movable head 6 is welded or otherwise rigidly secured to a carriage 56 consisting of upright support 58, base plate 60 and angle braces 62. The carriage 56 is supported by guide rollers 64 rotatably journaled on axles 66 secured to base plate 60 of the carriage 56 by bearing blocks 67.

Guide rollers 64 are in rolling contact with rails 68 extending longitudinally of pressure testing device 2 in substantially parallel relation to skids 18.

From the foregoing it should be readily apparent that a pipe 1 may be positioned in the V openings 23 of support plates 22 with one end thereof adjacent to fixed head 4. Actuation of hydraulic cylinder 43 will move carriage 56 and movable head 6 into contact with the other end of the pipe 1.

It will be understood that the joint of pipe 1 is shown merely for illustration purposes and that the invention described and claimed herein can be employed for testing valves, gauges, pressure vessels or other device which requires testing to assure that they have sufficient structural strength for a given application, or for calibration.

The movable heads 6 and the fixed head 4 include dome-shaped wall portions 108 which have a threaded passage 109 through the wall thereof which is normally closed by threaded plug 110. Passages 109 provide openings for bleeding or flushing air out of pipe 1 before it is closed for testing. After the pipe is thus purged the plug 110 may be threaded into passage 109 to provide a leak-proof closure during the testing operation.

Each dome-like cover 108 includes an annular skirt portion 108a which has formed on its inner side an annular recess 121. Preferably the surface of recess 121 is machined and finished to provide a smooth surface for receiving the seal ring assembly 115, hereinafter described.

Furthermore, it will be noted that the width of recess 121 is greater than the width of flange 118 of seal ring assembly 115 so that the seal can move along the recess 121, acting as a piston in response to variations of pressure within the dome 108.

A special seal ring assembly, generally designated 115, is provided in conjunction with the cover 108, said seal ring assembly including a seal ring 116 of resilient material, such as neoprene or rubber compound, and includes an annular lip 117 and an inwardly extending flange 118, said lip 117 and flange 118 being preferably, but not necessarily, disposed in right angular relationship with reference to their outer surfaces.

The flange 118 is reinforced with an annular rigid plate 119 to make said flange stiffer than lip 117. Flange 118 of seal ring 116 may be secured to annular plate 119 by any suitable means such as bonding. However, the particular embodiment illustrated in the drawing utilizes bolts 119a and washers 119b, extending through openings in flange 118 to threadedly engage annular plate 119 thereto.

Flange 118 might also be made of flexible, relatively pliable metal or other material which would provide a seal, such as aluminum, asbestos composition, Teflon, and the like.

Annular plate 119, reinforcing flange 118 of seal ring 116, is of sufficient width to cover the open ends of pipe 1 and provide a seal thereover. The outer surface 120 of plate 119 may have a resilient gasket 120a bonded or otherwise secured thereto which coincides with the surface of the edges of the end of pipe 1 so as to be in continuous contact therewith. Gasket 120a could also be a separate member.

The outer surface 122 of the lip 117 is preferably flat and closely conforms to the inner surface of recess 121 provided on the inner side of skirt 108a.

It will be noted that the lower surface 120 of plate 119 extends across the space 106a between the outer surface of the end of pipe 1 and the inner side of the lower end of skirt 108a to seal and close same when pressure is applied thereagainst as hereinafter described.

Plate 119 has a relieved portion 124 around the outer edge thereof to allow seal ring assembly 115 to float freely to conform with the configuration of the surface of the end of pipe 1 thereby preventing sticking or wedging if seal ring assembly 115 is tilted in recess 121. An outwardly extending shoulder 126 is formed on the outer edges of plate 119 whereby said shoulder contacts the end of skirt 108a to limit inward movement of seal ring assembly 115 as the movable head 6 is pushed against the end of pipe 1. A guide shoulder 125 is provided about the edges of the inner end of plate 119 and moves along and through recess 121 in skirt 108a.

Plate 119 has an opening 119c centrally located therein, having a shoulder 119d extending inwardly into said opening.

A backup plate 128 having spaced openings 128a therethrough may be rigidly secured by bolts 128b to shoulder 119d to stiffen plate 119 and flange 118 if reinforcement is required to provide strength at high pressures. Backup plate 128 is intended to prevent undue distortion of seal ring assembly 115.

From the foregoing it should be readily apparent that seal ring assembly 115 may be constructed of a variety of materials having physical characteristics which accomplish a seal between lip 117 and surface 122 and between surface 120 and the end of pipe 1, while exhibiting sufficient structural strength to withstand the internal pressure employed for testing pipe 1. It should also be readily apparent that seal ring assembly 115 may assume various structural configurations depending upon the size of pipe being tested.

Fixed head 4 and movable heads 6 may be of identical construction. Supply line 3, connected to any suitable source of pressurized fluid, may be connected through threaded openings 109 in cover of 108 of fixed head 4 or movable heads 6 for providing sufficient internal pressure to test pipe 1.

The operation and function of the seal and closure member hereinbefore described is as follows:

The pipe 1 is positioned on supports 22 having adjustable height because of jacks 24. One end of pipe 1 is positioned adjacent fixed head 4 and movable head 6 on carriage 56 by extending cylinder 44, causing the covers or domes 108 to be placed over the open ends of the pipe 1 with the seals mounted in recesses 121. The gaskets 120a of the seal ring assemblies 115 are engaged between the faces 120 of ring 119 and the ends of the pipe 1.

It will be noted that this operation is quickly, simply, and easily carried out without the necessity of tools, welding or other means for attachment of same.

The plug 110 is removed to purge air from the pipe after the injected pressure fluid is connected with the inlet conduit 3. The plug 110 is then replaced and the liquid or gas pressure is applied to the interior of the tank through the inlet passage 3 to test same.

Such injected pressure acts on the surface 116a of each seal 116 and on the inner surfaces 123 of the lips 117 to force gasket 120a on each plate 119 against the end of the pipe and the outer surfaces 122 of the lips 117 against the inner surface of the recesses 121 to press such surfaces into sealing engagement. It will be noted that the seal assembly moves outwardly like a piston in carrying out the sealing function.

The greater the pressure applied internally of the pipe the more positive and secure the seal is. It will be noted that the seal pressure is uniformly applied along both the surface 120 and surface 122 to provide a uniform seal without areas for leakage.

Description of a second embodiment

Sealing heads 4a and 6a illustrate a second embodiment of sealing heads of the invention, incorporating a plurality of seal ring assemblies 130, 132 and 134 disposed in spaced apart relation whereby pipe of varying diameters may be tested utilizing a single set of sealing heads. The sealing heads may be secured to fixed plate plate 10 and movable plate 58 in the same manner as heretofore described in connection with the first embodiment.

Seal ring assembly 130 may be utilized for running pressure tests on small diameter pipe 1a. Rings 132 and 134 are of progressively larger diameter and may be utilized for testing larger diameter pipe 1b and 1c.

Each seal ring assembly 130, 132 and 134 is of similar construction to that of seal ring assembly 115 illustrated in FIGURE II of the drawing. Seal ring assemblies 130, 132 and 134, as illustrated in FIGURES IV and V, may be constructed of the same material used in constructing seal ring 116 of the first embodiment.

Each seal ring assembly 130, 132 and 134 includes reinforcing rings 119f, constructed of hard plastic Teflon or metal depending upon the structural requirements necessary for containing the internal pressure to be applied for testing pipe to which are secured resilient rings 116a, 116b and 116c.

If metal is used for construction of reinforcing rings 119f of seal ring assemblies 130, 132 and 134 and it is not deemed expedient to utilize a metal to metal contact for sealing, a resilient gasket 136 may be positioned between the reinforcing rings 119f and the end of the pipe.

Seal ring assembly 130 is maintained in floating relation to a dome-shaped cover 108c having substantially the same configuration as dome 108 heretofore described and shown in FIGURE II of the drawing, except that the skirt portion 108d of the cover is thicker. Dome 108c is located in a central portion of pressure head 6a having annular grooves 132a and 134a disposed thereabout. Threaded passages 109a communicate with annular grooves 132 and 132b and are normally closed by threaded plugs 110a. Plugs 110a may be removed to purge the pipe of air before testing same. Seal ring assemblies 132 and 134 are slidably disposed in annular grooves 132a and 134a respectively and have resilient annular seals 116b and 116c respectively bonded or otherwise securely attached to the inner end of each seal ring assembly. Resilient seal 116a is bonded or otherwise securely attached to the inner end of seal ring assembly 130.

For testing a pipe 1b, utilizing seal ring assembly 132, the pipe 1b will be placed on support plates 22 of testing device 2 as illustrated in FIGURE I of the drawing.

Movable carriage 56, supporting movable head 6a will be moved toward pipe 1b until seal gaskets 136 on the rings 119f disposed in fixed head 4a and movable head 6a are in contact with opposite ends of pipe 1b.

Plugs 110a closing openings 109a communicating with each annular groove 132a and 134a and the inside of dome 108c are available for purging the pipe if necessary.

Pressure may be applied through line 3 connected to an opening 109 through dome-shaped cover 108c on fixed head 4a, causing pressure to be exerted inside pipe 1b. Fluid in pipe 1b flows into annular groove 132a, exerting pressure against resilient seal 116b, causing the seal ring assembly 132 to move outwardly thereby sealing the outer surface 122a of annular groove 132a, the outer surface of plate 119f of seal ring 132 and the surface between gasket 136 and the end of pipe 1b.

Each seal ring assembly 130, 132 and 134 has a recessed portion 140 adjacent the outer edge thereof to compensate for slight variations and stretch of the seal rings when high pressure is applied.

It should be noted that when seal ring assembly 132 is being utilized for testing a pipe 1b, seal ring assembly 130 does not move because equilibrium is maintained due to equal and opposite forces exerted on opposite sides of seal ring 130.

It should also be noted that when seal ring assembly 132 is being utilized with pipe 1b, seal ring 134 does not move because equilibrium is maintained by equal and opposite pressure being exerted on opposite sides of seal ring 134 which is in the atmosphere outside pipe 1b.

It should also be noted that pressure heads 4a and 6a may be utilized for testing pipes, valves or gauges having openings at opposite ends thereof which are not of equal diameter. Seal ring assembly 134 on pressure head 4a may be utilized for closing one end of the bore of the object being tested while seal ring assembly 132 on pressure head 6a may be utilized for closing the opposite end of the object having a bore diameter different from that of the other end.

Description of a third embodiment

A third embodiment of my invention is shown in FIGURE VI of the drawing which utilizes a pressure head having a configuration identical to that of pressure head 6a heretofore described and shown in FIGURE IV of the drawing.

Seal ring assemblies 140, 142 and 144 are disposed in spaced apart relation in annular grooves 132a and 134a, communicating with threaded passages 109a normally closed by threaded plugs 110.

The third embodiment differs from the second embodiment in that the construction of seal ring assemblies 140, 142 and 144 differs slightly from that of seal ring assemblies 130, 132 and 134 illustrated in the second embodiment of the invention. Seal ring assemblies 140 142 and 144 are identical, each resilient seal ring 148 being made of resilient material such as neoprene or rubber compound including an annular lip 147 and an inwardly extending flange 148a, said lip 147 and flange 148a being preferably, but not necessarily, disposed in right angular relationship with reference to their outer surfaces.

A rigid retainer ring 150 is secured as by bonding within and adjacent the outer ends of flange 148a of each seal ring assembly 140, 142, and 144 whereby the resilient material of the seal member 148 will be extruded in a direction toward the open end of pipe 1, forming an effective seal and providing sufficient structural strength to withstand high pressure.

Retainer ring 150 has a tapered or relieved portion 152 at the outer edge thereof to prevent wedging if seal assembly is tilted and to compensate for slight deformation of the seal rings 140, 142 and 144 relative to skirt 108g.

The outer ends of seal members 148 contact and seal against the ends of pipe 1 being tested upon outward movement of the seal assembly in response to pressure injected within the pipe.

In all forms described the seal assembly is freely movable like a piston within the skirt portion of the dome similar to a piston so that the greater the pressure within the dome, the better the seal.

Operation of the embodiment shown in FIGURE VI of the drawing is identical to that of the second embodiment shown in FIGURE IV of the drawing.

From the foregoing it should be readily apparent that I have developed a new and novel pressure testing device which is simple and easy to attach, providing a uniform and positive seal about the ends of the object being tested, which is adaptable to different sizes and shapes of openings. While pressure heads 4 and 6 are in axial alignment in the particular embodiments illustrated in the drawing, I anticipate utilizing the general concept of my invention for testing devices which do not have axially aligned openings by repositioning pressure heads 4 and 6 relative one to the other.

It will be understood that other and further embodiments of my invention than those indicated above may be employed.

Having thus described my invention, I claim:

1. In a pressure testing device for a conduit, a frame, anchor members at each end of the frame, a first sealing head fixedly secured to one of the anchor members on said frame, a carriage moveably attached to said frame adapted to move longitudinally of the frame, a second sealing head fixedly secured to said carriage, stanchions secured to said frame between the anchor members, support means slideably carried by said stanchions, adjusting means between the frame and support means adapted to vertically move said support means relative to the sealing heads, said sealing heads including sealing assemblies therein adapted to engage and seal against the ends of the conduit when positioned on the support means, moveable means mounted between one of the anchors and the carriage for moving said second sealing head relative to the conduit to bring the sealing assembly therein into engagement with the end of the conduit, and means for delivering pressurized fluid to the interior of the conduit through one of the sealing heads.

2. The combination called for in claim 1 wherein the adjusting means for moving said plates includes at least one extensible jack attached between the frame and each plate.

3. The combination called for in claim 1 wherein the stanchions are channel-shaped members and the edges of the support plates are slideably disposed in said channel members and aligned V-shaped notches in the plates for receiving and centering a conduit.

4. The combination called for in claim 3 wherein the stanchions have aligned holes therethrough adjacent one end thereof, and tie bars extend longitudinally of said frame through said holes for securing the stanchions to the anchor members at each end of the frame.

5. In a pressure testing device for a conduit, a frame, anchor members at each end of the frame, support means attached to the frame adapted to support the conduit on said frame between the anchor members, a first sealing head fixedly secured to one of the anchor members on said frame, a carriage moveably attached to said frame adapted to move longitudinally of the frame, second sealing head fixedly secured to said carriage, each of said sealing heads including a seal ring receptacle, including an annular skirt portion, at least one seal ring assembly disposed within the skirt portion, said seal ring assembly being comprised of a resilient outer lip having an outer surface conformable to the inner surface of the skirt, and an inwardly extending flange, and having means on said flange having an outer surface engageable with the surface about an end of the conduit, said seal ring assembly being free of attachment to the skirt and being freely moveable with respect to the skirt after the receptacle is positioned adjacent the end of the conduit, moveable means mounted between one of the anchors and the carriage for moving said second sealing head relative to the conduit to bring the sealing assembly therein into engagement with the end of the conduit, and means for delivering pressurized fluid to the interior of the conduit through one of the sealing heads.

6. The combination called for in claim 5 wherein the means for moving the second head includes a hydraulic cylinder rigidly secured to and extending through one of said anchor members, said cylinder having a fluid actuated piston slideably disposed therein, with a rod attached to the piston movably extending from the inner end of the cylinder and attached to the second sealing head whereby actuation of the piston imparts motion to the second sealing head.

7. The combination called for in claim 6 with the addition of guide means between the frame and the carriage, said carriage being adapted to move longitudinally along said guide means.

8. The combination called for in claim 7 wherein the guide means includes a track consisting of spaced rails extending longitudinally of a portion of said frame between said anchor members and rollers on the carriage movable along said rails.

9. The combination called for in claim 5 wherein said means on said flange includes an annular ring secured to said flange and having at least one hole therethrough, said flange secured to the inner side of said ring, and a resilient gasket positionable on the outer surface of said annular ring engageable with the surface of the end of the conduit to seal thereagainst.

10. The combination called for in claim 9 with the addition of an annular shoulder at the outer edge of the annular ring adapted to engage the outer end of the skirt portion to limit inward movement of the seal ring assembly.

11. The combination called for in claim 5 wherein the skirt portion of the receptacle has an annular flange thereon, a plurality of spaced annular grooves formed in the flange, a seal ring assembly slideably disposed in each annular groove, each seal ring assembly having an inner diameter less than the inner diameter of the annular groove whereby pressurized fluid passes inwardly of the seal ring assembly into the annular groove.

12. The combination called for in claim 11 wherein the seal ring assembly is comprised of a rigid ring disposed about the outer side thereof having a relieved area thereabout providing a shoulder about the inner end thereof and a resilient ring portion secured on the inner side of the rigid ring.

13. The combination called for in claim 5 wherein said receptacle is a cover arranged to close one end of a joint of pipe.

14. The combination called for in claim 13 with the addition of a removable plug in the wall of the cover.

15. The combination called for in claim 5 with the addition of a recess about the inner side of the skirt arranged to receive the seal ring assembly.

16. The combination called for in claim 15 wherein the recess is wider than the outer lip.

17. In a pressure testing device for a conduit, a frame, anchor members at each end of the frame, support means attached to the frame adapted to support the conduit on said frame between the anchor members, a first sealing head fixedly secured to one of the anchor members on said frame, a carriage moveably attached to said frame adapted to move longitudinally of the frame, a second sealing head fixedly secured to said carriage, said sealing heads including a skirt extending outwardly therefrom, sealing assemblies slideably disposed in the skirt of each sealing head adapted to engage and seal against the ends of the conduit when positioned on the support means, each sealing assembly including a seal ring comprising a ring portion made of resilient material having an outer lip and an inwardly turned flange angularly disposed with reference to the outer lip, the inwardly turned flange being reinforced to provide a stronger construction than the outer lip, said seal ring being slideably disposed in each sealing head, moveable means mounted between one of the anchors and the carriage for moving said second sealing head relative to the conduit to bring the sealing assembly therein into engagement with the end of the conduit, and means for delivering pressurized fluid to the interior of the conduit through one of the sealing heads.

18. The combination called for in claim 17 wherein the flange includes a reinforcing member having a relieved area on the outer side thereof.

19. The combination called for in claim 17 with the addition of a recessed area about the inner side of the skirt and the outer lip is slideably disposed in the recess.

20. The combination called for in claim 17 with the addition of a rigid retainer ring about the outer surface of the flange of the seal ring whereby the resilient material of the flange may be extruded in a direction toward the end of the conduit.

References Cited

UNITED STATES PATENTS

| | | | |
|---|---|---|---|
| 2,671,338 | 3/1954 | Reichl | 73—49.6 |
| 2,895,328 | 7/1959 | Payne et al. | 73—49.1 |
| 2,959,955 | 11/1960 | Pasquale | 73—49.1 |
| 3,030,901 | 4/1962 | McConnell | 73—49.1 XR |
| 3,181,347 | 5/1965 | Ohmstede | 73—49.1 |

LOUIS R. PRINCE, Primary Examiner

JEFFREY NOLTON, Assistant Examiner

U.S. Cl. XR.

73—49